United States Patent
Hecht et al.

(10) Patent No.: US 9,690,841 B2
(45) Date of Patent: Jun. 27, 2017

(54) METHOD AND APPARATUS FOR DETERMINING A CLASS REFERENCE DATA RECORD FOR THE CLASSIFICATION OF VALUE DOCUMENTS

(75) Inventors: Matthias Hecht, Eichenstrasse (DE); Ingo Scholz, Bremen (DE); Shanchuan Su, Neubiberg (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 248 days.

(21) Appl. No.: 13/996,708

(22) PCT Filed: Dec. 14, 2011

(86) PCT No.: PCT/EP2011/006319
§ 371 (c)(1),
(2), (4) Date: Aug. 5, 2013

(87) PCT Pub. No.: WO2012/084145
PCT Pub. Date: Jun. 28, 2012

(65) Prior Publication Data
US 2013/0311477 A1 Nov. 21, 2013

(30) Foreign Application Priority Data
Dec. 23, 2010 (DE) .......... 10 2010 055 974

(51) Int. Cl.
*G06F 17/30* (2006.01)
*G07D 7/20* (2016.01)

(52) U.S. Cl.
CPC ..... *G06F 17/30598* (2013.01); *G07D 7/2058* (2013.01); *G07D 7/2075* (2013.01)

(58) Field of Classification Search
CPC ......... G06F 17/30598; G06F 17/30867; G06F 17/3089
See application file for complete search history.

(56) References Cited

U.S. PATENT DOCUMENTS 5,633,949 A 5/1997 Graves et al.
6,243,501 B1 * 6/2001 Jamali .................. G06K 9/2054
382/224
(Continued)

FOREIGN PATENT DOCUMENTS

CN 1500257 A 5/2004
CN 1685373 A 10/2005
(Continued)

OTHER PUBLICATIONS

He, Chao et al., "Employing Optimized Combination of One-Class Classifiers for Automated Currency Validation", Pattern Recognition, Elsevier, GB, Bd. 37, Nr. 6, Jun. 1, 2004.
(Continued)

*Primary Examiner* — Cam-Y Truong
(74) *Attorney, Agent, or Firm* — Workman Nydegger (57) ABSTRACT

A method and apparatus for determining a class reference data record for classifying documents of value includes creating a class reference image using a multiplicity of reference images of already classified documents of value in the same class; and creating a class reference data record having at least one class reference parameter using the class reference image. The pixel and intensity values of the respective pixel in the class reference image are a function of the pixel values of the relevant pixels in the multiplicity of reference images of already classified documents of value in the same class. The method includes determining at least one quantitative property of a document of value to be classified; and classifying the document of value to be classified on the basis of a comparison between the quantitative property of the document of value to be classified and the class reference data record.

15 Claims, 3 Drawing Sheets

(56) References Cited

U.S. PATENT DOCUMENTS

| | | | |
|---|---|---|---|
| 6,439,395 B1 | 8/2002 | Voellmer et al. | |
| 7,092,560 B2 | 8/2006 | Jones et al. | |
| 7,130,463 B1* | 10/2006 | Spangler | G06K 9/4642 382/168 |
| 7,545,992 B2* | 6/2009 | Kato | H04N 1/00209 345/666 |
| 8,245,831 B2* | 8/2012 | Holl et al. | 194/206 |
| 2002/0066125 A1 | 5/2002 | Mukai | |
| 2003/0047494 A1 | 3/2003 | Lhomme | |
| 2003/0226112 A1* | 12/2003 | Murata | G06F 17/24 715/210 |
| 2004/0131242 A1 | 7/2004 | Klevtsov | |
| 2004/0247169 A1* | 12/2004 | Ross et al. | 382/137 |
| 2004/0264781 A1* | 12/2004 | Eschbach et al. | 382/226 |
| 2005/0244046 A1 | 11/2005 | Yamamoto | |
| 2005/0289018 A1* | 12/2005 | Sullivan et al. | 705/27 |
| 2007/0154079 A1* | 7/2007 | He et al. | 382/135 |
| 2008/0123081 A1 | 5/2008 | Stein et al. | |
| 2008/0123931 A1* | 5/2008 | He et al. | 382/135 |
| 2008/0123953 A1* | 5/2008 | Anderson | H04N 5/2351 382/168 |
| 2008/0283451 A1* | 11/2008 | Holl | G07D 7/18 209/534 |
| 2009/0074229 A1* | 3/2009 | Giering | G07D 7/122 382/100 |
| 2010/0195918 A1 | 8/2010 | Yonezawa et al. | |
| 2011/0299770 A1* | 12/2011 | Vaddadi et al. | 382/165 |
| 2012/0002899 A1* | 1/2012 | Orr, IV | G06T 5/50 382/282 |

FOREIGN PATENT DOCUMENTS

| | | |
|---|---|---|
| CN | 2891113 Y | 4/2007 |
| CN | 101366060 A | 2/2009 |
| CN | 101635069 A | 1/2010 |
| CN | 101796550 A | 8/2010 |
| DE | 10 2004 036 229 A1 | 2/2006 |
| DE | 10 2004 045 169 A1 | 3/2006 |
| EP | 1 019 869 A1 | 7/2000 |
| EP | 1 062 643 A1 | 12/2000 |
| EP | 1944737 A1 | 7/2008 |
| EP | 2 187 359 A1 | 5/2010 |
| JP | 2007-251980 A | 9/2007 |
| JP | 2007-299189 A | 11/2007 |
| WO | 02/075673 A1 | 9/2002 |
| WO | 2006/018283 A2 | 2/2006 |
| WO | 2007068930 A1 | 6/2007 |

OTHER PUBLICATIONS

International Search Report for corresponding PCT Application No. PCT/EP2011/006319 dated Mar. 5, 2012.
German Search Report from German Application No. 10 2010 055 974.1, Mar. 18, 2013.

* cited by examiner

METHOD AND APPARATUS FOR DETERMINING A CLASS REFERENCE DATA RECORD FOR THE CLASSIFICATION OF VALUE DOCUMENTS

The invention relates to a method for determining a class reference data record for the classification of value documents, in particular bank notes, upon which features of a value document to be classified are ascertained and, with the aid of the features of the value document, a class is determined from several possible classes for the value document by means of the class reference data record. The invention further relates to an apparatus for carrying out the method, to a computer program for carrying out the method, as well as to a data carrier with the computer program.

Value documents are understood within the framework of the present invention to be sheet-shaped objects that represent for example a monetary value or an authorization and hence should not be producible arbitrarily by unauthorized persons. They hence have security features that are not simple to produce, in particular to copy, whose presence is an indication of authenticity, i.e. of production by an authorized body. Important examples of such value documents are chip cards, coupons, vouchers, checks and in particular bank notes.

Classification methods are used, inter alia, upon the detection and subsequent sorting of bank notes in bank note processing apparatuses. In so doing, at first physical properties of the bank note to be classified are measured and a plurality of features of the bank note is derived therefrom. Using the features and with the aid of classification criteria there is then ascertained a class, i.e. selected from several possible classes, and the bank note is assigned to this class. In a subsequent sorting process, the bank note can then be output in an output pocket provided for the corresponding class. Such a bank note processing apparatus is described for example in EP 1 062 643.

In such bank note processing apparatuses there is often also taken a digital image of a bank note or of a region thereof by means of a suitable imaging sensor unit, for example a CCD or CMOS sensor. Such a digital bank note image consists of individual image points ("pixels") with associated pixel values or intensity values, the pixels of colored images normally having assigned thereto three pixel values. This bank note image is supplied in electronic form to a control and evaluation device of the bank note processing apparatus and can be employed by this, in addition to other measured properties of the bank note, for the classification of the bank note. For this purpose, with the aid of the digital image of the bank note or a part thereof and by means of the control and evaluation device of the bank note processing apparatus there is quantitatively determined an optical or physical parameter of the bank note, for example an averaged intensity value in a particular region of the bank note image, and compared with a corresponding reference parameter from a specified reference data record, the reference parameter having a predetermined tolerance range allowing certain deviations from the reference parameter.

Further bank note processing apparatuses, in which digital bank note images are used, are described for example in U.S. Pat. No. 7,092,560 and EP 2 187 359.

The present invention is based on the object of providing an improved method as well as a corresponding apparatus for determining a class reference data record for the classification of value documents and in particular bank notes.

This object is achieved according to the invention by the subject matter of claim 1. A corresponding apparatus for classifying value documents, in which such a method is used is subject matter of the independent apparatus claim. Advantageous developments of the invention are defined in the subclaims.

The method according to the invention for determining a class reference data record for the classification of value documents, in particular bank notes, has the following steps: the creating of a class reference image by means of a plurality of reference images of already classified value documents of the same class, i.e. by means of a plurality of images of reference value documents of a class; and the creating of the class reference data record having at least one class reference parameter with the aid of the class reference image. Here, the solution according to the invention is characterized in that the pixel values or intensity values of a respective pixel of the class reference image are a function of the pixel values of the corresponding pixels of the plurality of reference images of already classified value documents of the same class.

The class reference data record thus determined can be advantageously used in a method for classifying value documents, in particular bank notes, which comprises the following further steps: the determining of at least one quantitative property of a value document to be classified; and the classifying of the value document to be classified on the basis of a comparison of the quantitative property of the value document to be classified with the class reference data record.

A reference image of a reference value document can be a digital image of the entire value document or of a part thereof.

In accordance with a preferred embodiment, each class reference parameter of a class reference data record has assigned thereto a tolerance range that defines the maximum allowable deviations of the quantitative property of the value document to be classified from the class reference parameter, at which deviations the value document to be classified would still be allocated to the class defined by the class reference parameter or class reference data record.

Preferably, in an adaptation process for each class to which a value document can be allocated there are created a class reference image and a class reference data record having at least one class reference parameter by means of a plurality of reference images of reference value documents of a respective class. The reference value documents of a class preferably are used reference value documents, when subsequently a classification of used value documents is to be performed.

Since in the case of a large number of security features and classification criteria of a value document, the specialist knowledge and the experience of experts are often required to guarantee a reliable specification and setting of the class reference parameters of a class reference data record, it has proven to be advantageous that, during the adaptation process, the class reference image of a class of value documents is represented, for the analysis, on a display unit by means of a graphical user interface. Advantageously, the graphical user interface allows the user to participate in the creation of class reference parameters of a class reference data record with the aid of the class reference image, for example by the user defining particular regions of the class reference image by means of the graphical user interface and the regions thus defined being used for creating or adjusting class reference parameters of a class reference data record. Likewise, the creation of the class reference parameters of a class reference data record with the aid of the class reference image can be effected at least partly or completely without the participation of a user, for example by means of suitable software routines that are configured to determine regions of particular pixel values in a digital image.

The possible classes, from which one is to be chosen, are for example the possible occurring face values of the value documents to be classified. In the case of bank notes, these are the denominations of the different bank notes. Possible classes can then be provided for example for 5, 10, 20, 50, 100, 200 and 500 Euro notes.

In general, the ascertainment of a class can also be effected, however, with respect to the authenticity and/or fitness, i.e. the suitability of the value document for reuse. The individual possible classes then reflect for example different degrees of authenticity or fitness of the value documents to be classified, such as for example "authentic", "fit for use", "to be destroyed" and the like.

Preferably, the step of creating at least one class reference image by means of a plurality of reference images from already classified value documents of the same class further comprises the step of aligning the plurality of reference images of already classified value documents of the same class with respect to a common reference point. In the case of bank notes, for example one of the corners of the already classified bank notes of the same class can serve as such a reference point. Such an alignment mechanism is preferably also used upon the classification of a value document to be classified with the aid of a class reference data record generated by means of the class reference image.

In accordance with a preferred embodiment, for some or all of the classes more than one class reference image can be created by means of the plurality of reference images of already classified value documents of the same class and the class reference data record having at least one class reference parameter can be created with the aid of more than one class reference image.

In a preferred embodiment, the pixel values of a pixel of a class reference image are the minima of the corresponding pixel values of the corresponding pixels of the plurality of reference images of already classified value documents of the same class. With the aid of such a class reference image, in the case of bank notes, there can be easily determined for example the region of a bank note image, in which particular low-intensity optical features occur, whose positions on the bank note are subject to a certain variation, e.g. the serial number of a bank note. This makes it possible to adjust the class reference parameter of a class reference data record and its tolerance range such that the serial numbers of value documents to be classified lie with high probability within this tolerance range thus determined.

In accordance with a further preferred embodiment, the pixel values of a pixel of the class reference image are the average values of the corresponding pixel values of the corresponding pixels of the plurality of reference images of already classified value documents of the same class. In the case of bank notes this is advantageous upon the definition of a region in which upon the subsequent classification a security feature, e.g. a security thread, is to be found with high probability.

In a further preferred embodiment, the pixel values of a pixel of the class reference image are the maxima of the corresponding pixel values of the corresponding pixels of the plurality of reference images of already classified value documents of the same class.

In accordance with a further preferred embodiment, the pixel values of a respective pixel of the class reference image are determined by the difference between the maximum pixel value and the minimum pixel value of the corresponding pixels of the plurality of reference images of already classified value documents of the same class. This is particularly advantageous insofar as there can thus be detected errors in the alignment of the reference images of the already classified value documents of the same class upon the creation of the class reference image. This can be done either by a user by means of the graphical user interface, which displays the class reference image, and/or automatically by a corresponding algorithm implemented for example as a software. If for example the intensity in an extended pixel region of the class reference image created in this way exceeds a predetermined threshold value, this may be due to an error in the alignment of the images of the already classified value documents of the same class. In such a case, the method according to the invention provides that the class reference data record created with the faulty alignment is discarded and a new class reference data record is created with a corrected alignment.

In case of colored images, in which each pixel has assigned thereto more than one pixel value or color coordinate value in a color space, color coordinate values can be generated in an arbitrary manner. For example, images of value documents can be captured simultaneously or one after the other in several spectral regions specified preferably in dependence on the employed color space. The images can be captured respectively simultaneously for the entire section. However, it is also possible to capture the data by a sensor line and the value document being moved relative to each other at a specified speed in a direction transverse to the sensor line, and to assemble the data thus captured line by line for the pixels into an image, or imagine them thus assembled. The color coordinate values can here be obtained either directly by employing suitable sensor units or after transformation of other captured image data.

In principle, it is possible to employ arbitrary color spaces in the method. Preferably, however, color spaces with three dimensions are employed, but it is also possible to employ even higher-dimensional color spaces. As a color space there can further also be employed a color space that is specific for the sensor unit employed for the imaging. In particular, there can be employed for example the RGB or the HSI color space as a color space. Preferably, a color space defined independently of a device is employed as a color space. In particular, for example a standardized color space, such as the CIE XYZ color space can be employed as a color space.

The method according to the invention can be carried out completely or at least partly automatically in particular by means of a corresponding apparatus for the classification of value documents. In the apparatus according to the invention, a control and evaluation device in principle can be designed as arbitrary analogue, mixed analogue-digital or purely digital circuit. It is also possible that this comprises solely a so-called "field programmable gate array" (FPGA), which has the advantage that corresponding modules can be adjusted for the method to be carried out solely by pre-programming, but upon carrying out work like a digital circuit. In this way, in the case of small-scale series the production costs can be kept low. Preferably, however, the control and evaluation device has at least one processor and one memory in which a computer program according to the invention, which is executable with the processor, for carrying out the method according to the invention is stored. The employment of a programmable control and evaluation device has the advantage that the apparatus can be easily adjusted to new types of value documents.

A "processor" within the context of the invention is understood to be any processor, for example a microcontroller, or a multi-purpose processor, or a digital signal processor, or a combination with a multi-purpose processor and/or a signal processor and/or a microcontroller and/or an FPGA.

The object is thus further achieved by a computer program for carrying out the method according to the invention. Such a computer program can be stored in particular in the memory of the control and evaluation device.

A further subject matter of the invention is a data carrier, on which a computer program according to the invention is stored. As data carriers there come into consideration in particular optical data carriers, such as for example CDs or DVDs, magneto-optical data carriers, magnetic data carriers, such as for example hard disks, and semiconductor memories, for example EEPROMs or flash memories, whose contents can be accessed by a corresponding device of a computer.

In order for a user to be able to analyze a class reference image and, where applicable, the reference images of the same class on which the class reference image is based, the control and evaluation device is connected, in accordance with a preferred embodiment, with a computer having a display unit. On the computer there is implemented a graphical user interface, by means of which a class reference image created according to the invention can be represented on the display unit. The computer can further be connected with an external database for storing data, in particular image data. In other embodiments, the computer and/or the external database can be integrated in the control and evaluation device.

The invention will hereinafter be explained more closely by way of example with reference to the drawings. There are shown.

Figure 1:
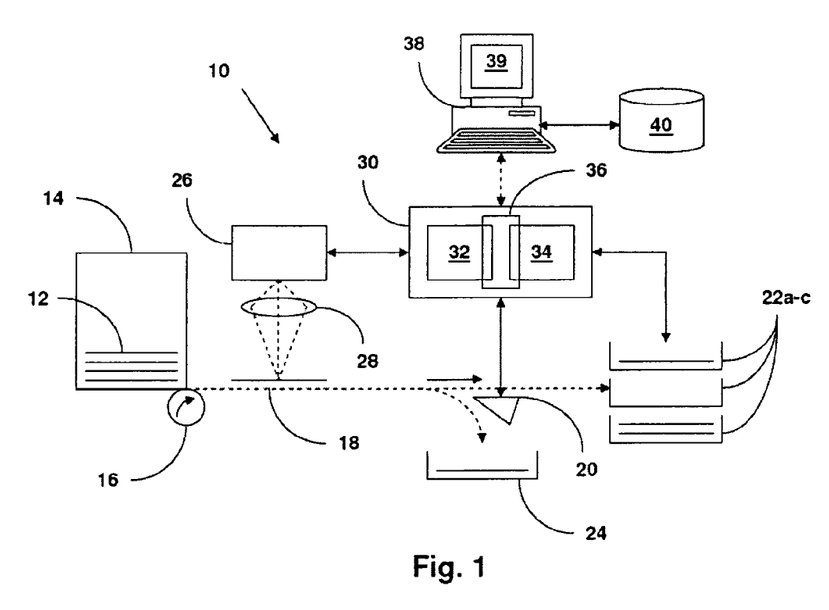
FIG. 1 a schematic representation of a bank note processing apparatus.

FIG. 1 shows an apparatus 10 for determining a class reference data record and for determining one of several possible states and thus for the classification of value documents, in the example a bank note processing apparatus that serves, inter alia, to ascertain the state of value documents in the form of bank notes 12. The apparatus 10 has an input pocket 14 for the input of bank notes 12 to be classified in the form of a stack and a singling device 16 known to the person skilled in the art, which can access the bank notes 12 in the input pocket 14 and feed these to a transport system 18 having a gate device 20. Downstream of the gate device 20 along a first branch of the transport system 18 there are located several output pockets 22a-c, which in turn respectively have connected upstream a gate device (not represented), in order to guide a bank note 12 into one of the output pockets 22a-c. The apparatus 10 finally has, along a second branch of the transport system 18, a reject pocket 24 for sorted-out bank notes. Of course, a bank note processing apparatus according to the invention can also have, instead of the three output pockets 22a-c shown in FIG. 1, more or less output pockets, for example respectively one output pocket for the denominations occurring in a currency.

Along a transport path defined by the transport system 18, after the singling device 16 and before the gate device 20, a bank note 12 to be classified runs through the field of view of a sensor unit 26, which serves in combination with an optical device 28 known to the person skilled in the art, for example a lens arrangement, for capturing optical properties of bank notes 12 fed in singled form and for forming corresponding sensor signals.

A control and evaluation device 30 is connected with the sensor unit 26, the gate device 20 and the gate devices connected upstream of the output pockets 22a-c via signal connections, as this is indicated in FIG. 1 by double arrows, and serves for evaluating sensor signals of the sensor unit 26 and for driving for example the gate device 20 and the gate devices connected upstream of the output pockets in dependence on the result of the evaluation of the sensor signals.

The sensor unit 26 comprises at least one imaging optical sensor for creating a digital image of at least a section of a bank note 12, preferably of the whole bank note 12, by means of optical radiation that is remitted by the bank note 12 (remission) and/or passes through this (transmission). For this purpose, the apparatus 10 further has at least one light source (not represented) that is suitably configured and arranged relative to the bank note 12 and to the sensor unit 26. Preferably, the imaging optical sensor is a CCD or CMOS sensor, which preferably creates a digital image of the entire bank note 12, which image consists of individual pixels or image points with associated pixel values or intensity values. As this is known to the person skilled in the art, in the case of a colored image of a bank note 12 each pixel normally has more than one pixel value or color coordinate value. Of course, the apparatus 10 can have, in addition to the sensor unit 26, still further sensors, such as for example optical sensors that work in other wavelength ranges (e.g. infrared), ultrasonic sensors, sensors for determining magnetic and/or other physical properties and the like, which can also be part of the sensor unit 26.

For the creation of a digital image of a bank note 12 upon the transport of the bank note 12 through the field of view of the sensor unit 26, the sensor unit 26 can be configured such that an image is captured simultaneously for the entire bank note 12. It is also possible, however, that a sensor line of the sensor unit 26 captures line by line image data of a bank note 12 moved past the sensor line and the image data thus captured are assembled into a digital image of the bank note 12. The image data for a pixel comprise the pixel value or in the case of colored images the pixel values or color coordinate values (for example in the CIE XYZ color space), as well as the place or the location of the pixel on the bank note. A suitable color detection device, which can be employed as a sensor unit 26 in the bank note processing apparatus 10 according to the invention is described for example in WO 2006/018283.

In the case of colored images, pixel values or color coordinate values can be generated in an arbitrary manner. For example, digital images of bank notes can be captured simultaneously or one after the other in several spectral regions specified preferably in dependence on the employed color space. The color coordinate values can here be obtained either directly by employing suitable sensor or detection units or after transformation of other captured image data.

In principle, it is possible to employ arbitrary color spaces. Preferably, however, color spaces with three dimensions are employed, but it is also possible to employ even higher-dimensional color spaces. As a color space there can further also be employed a color space that is specific for the sensor unit 26 employed for the imaging. In particular, there can be employed for example the RGB or the HSI color space as a color space. Preferably, a color space defined independently of a device is employed as a color space. In particular, for example a standardized color space, such as the CIE XYZ color space can be employed as a color space.

In addition to the digital image data, the sensor unit 26 and, optionally, further sensor units can capture further properties of the bank note 12 moved past these sensor units, corresponding sensor signals being generated. From the sensor signals of the sensor unit 26 and, where applicable, further sensor units the control and evaluation device 30 ascertains upon a sensor signal evaluation at least one quantitative bank note property that is relevant for the checking of the bank notes with regard to their state. Preferably, several of these properties are ascertained and suitably linked with each other. Further, by means of the signals of the sensor unit 26 and, where applicable, further sensor units there is checked the authenticity of the bank notes. The bank note properties characterize the class and/or the state of the bank note 12, in this example the denomination and/or the state of the bank notes with regard to fitness for use or fitness for circulation, i.e. the suitability to be further employed as a means of payment.

The control and evaluation device 30 has for this purpose in particular, besides corresponding interfaces for the sensor unit 26 and optional further sensor units, a processor 32 and a memory 34 connected with the processor 32 and storing at least one computer program 36 with program code upon whose execution the processor 32 evaluates sensor signals, in particular for determining a class of a bank note to be classified, and accordingly controls the apparatus 10 and its components.

In particular, the control and evaluation device 30, more precisely the processor 32 therein, can check, after the quantitative ascertainment of at least one property of a bank note 12 to be classified, whether the quantitatively ascertained property falls within the tolerance range of a reference parameter of a class, i.e. within the tolerance range of a class reference parameter. Each class reference parameter and its tolerance range are part of a class reference data record. Preferably, one class reference data record per class is deposited in the memory 34 of the control and evaluation device 30, each class reference data record having at least one class reference parameter with a tolerance range.

If a quantitatively determined property of a bank note to be classified falls within the tolerance range of a class reference parameter of a class reference data record, the control and evaluation device 30 assigns the bank note to the class to which the class reference parameter or class reference data record belongs. In dependence on the ascertained class, the control and evaluation device 30, in particular the processor 32 therein, drives the transport system 18, the gate device 20, and the gate devices connected upstream of the output pockets 22a-c such that the checked bank note is transported according to its ascertained state and/or its ascertained denomination (i.e. according to its ascertained class) in one of the output pockets 22a-c for deposit or in the reject pocket 24 for a new manual check.

For the classification of bank notes 12, the control and evaluation unit 30 of the bank note processing apparatus is configured to carry out the method described in the following and illustrated with reference to a flowchart in FIG. 2. This method or parts thereof are carried out preferably by means of the computer program 36, which is stored in the memory 34 of the control and evaluation unit 30 and accesses the processor 32 thereof.

Figure 2:
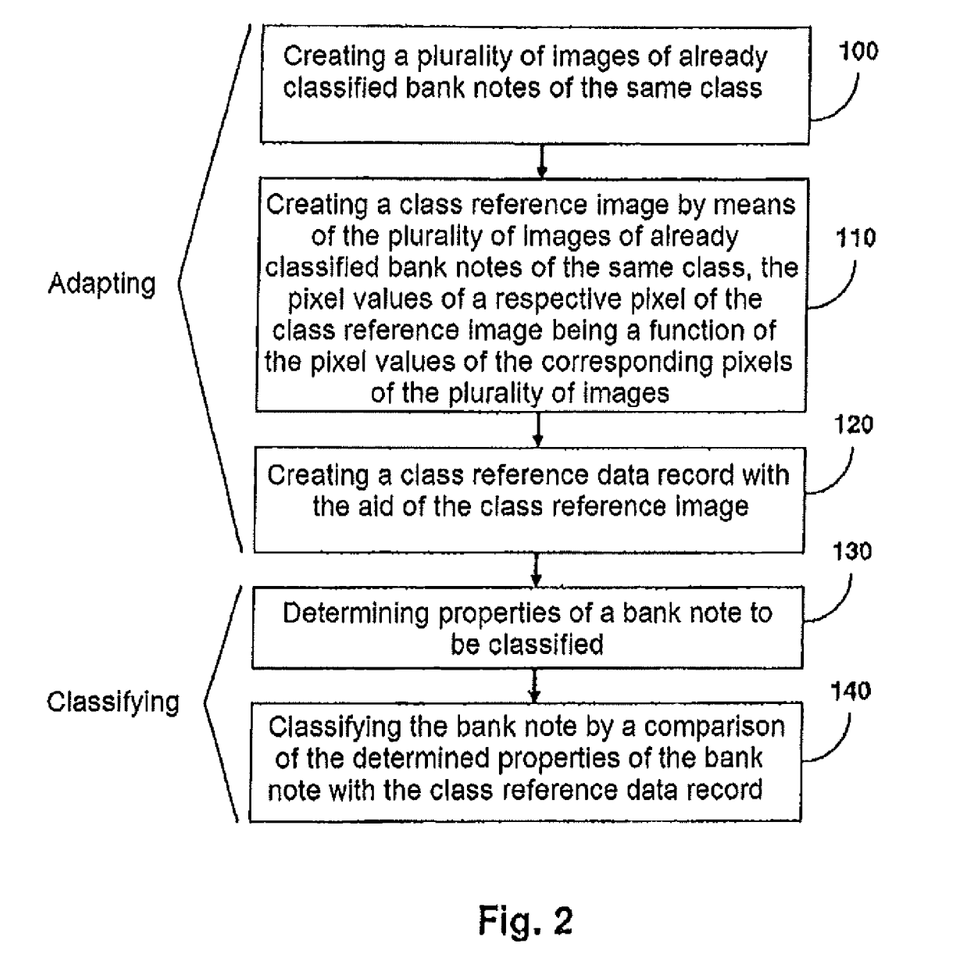
FIG. 2 a flowchart that illustrates the steps of the method according to the invention for classifying value documents in the form of bank notes.

In a first step 100 of the method for determining a class reference data record according to the invention, which is illustrated in FIG. 2, the digital image data of a plurality of reference bank notes of a class are captured, in order to generate a corresponding plurality of reference images. In so doing, the reference images can reproduce the corresponding reference bank note either completely or respectively only the same region thereof. The reference bank notes of a class preferably are used bank notes, when subsequently a classification of used bank notes is to be performed. In a next step 110, at least one class reference image is generated with the aid of the plurality of reference images of a class. Here, the intensity values of a respective pixel of a class reference image are a function of the intensity values of the corresponding pixels of the reference images of already classified bank notes of the same class. Upon the generation of the at least one class reference image, the reference images are aligned preferably with a common reference point, as this is schematically illustrated in the FIGS. 3a and 3b.

Figure 3A:
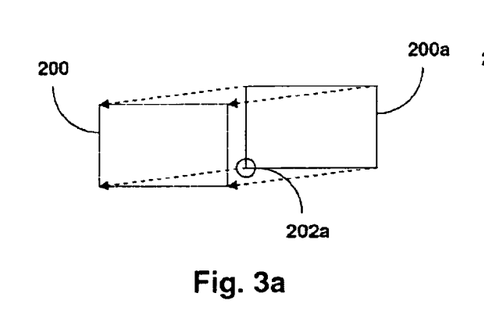
FIG. 3a and FIG. 3b a schematic representation of the mode of operation of a mechanism for aligning images of bank notes with a common reference point, which mechanism is implemented in the bank note processing apparatus of FIG. 1, and FIG. 4 a schematic representation of an exemplary bank note, which can be processed with the bank note processing apparatus of FIG. 1.
Figure 3B:
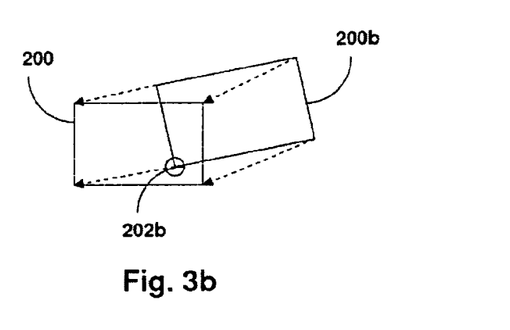

The FIG. 3a shows a reference image 200a of a reference bank note, which compared to a target position 200 is shifted parallel. The reference image 200b of a reference bank note shown in FIG. 3b, compared to the target position 200, is shifted parallel as well as rotated. In accordance with a preferred embodiment of the invention, in the control and evaluation unit 30 there is implemented an alignment mechanism, which brings the reference images 200a and 200b substantially into congruence with the common target position 200, in order to generate a class reference image with the aid of the reference images thus corrected and further reference images of reference bank notes of the same class corrected with the alignment mechanism. In so doing, the alignment mechanism preferably uses a common reference point of the reference images 200a, 200b, preferably a corner of the reference bank notes shown in the reference images 200a, 200b, for example, the lower left corner 202a, 202b of the reference bank notes.

After the creation of the at least one class reference image, wherein, where applicable, the above-described alignment mechanism is used, in step 120 of FIG. 2 a class reference data record is created with the aid of the class reference image. Here, a class reference data record comprises at least one class reference parameter that has allocated thereto a tolerance range, in order to define the "allowed" deviations of a quantitatively determined property of a bank note to be classified from the class reference parameter. In case of reference parameters that are based on a security feature localized on a particular position of a bank note, in a class reference data record there are preferably also contained, in addition to the one or the several class reference parameters as well as their respective tolerance ranges, information or data about where such a security feature is localized on the bank note, whereby these data in turn can have a certain tolerance.

Preferably, the steps 100 to 120 represented in FIG. 2 of the method according to the invention for determining a class reference data record are performed within the framework of a separate adaptation process, namely for each class of bank notes to be defined. The subsequent steps 130 and 140 are effected in the "actual" operation of the bank note processing apparatus 10, i.e. in the method according to the invention for classifying and sorting bank notes.

Figure 4:
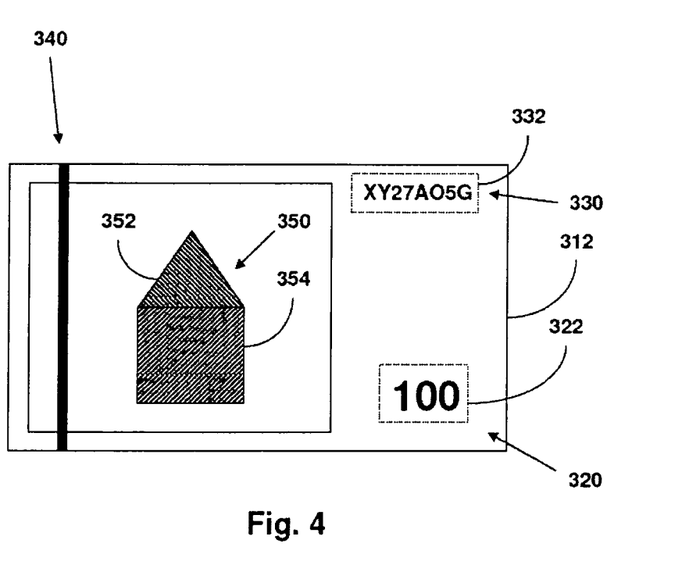

Preferred embodiments of the invention are described hereinafter in connection with the bank note 312 schematically represented in FIG. 4, which bank note can be processed, i.e. classified, with the bank note processing apparatus 10. On the exemplary bank note 312 the nominal value 320 and the serial number 330 of the bank note are printed. The bank note 312 further contains a security thread 340 as well as a motif 350 with a first section 352 that absorbs radiation in a particular wavelength range, preferably infrared radiation (IR radiation), and a second section 354 that is transmissive to radiation in this particular wavelength range, preferably IR radiation.

In accordance with a preferred embodiment, the pixel values of a pixel of a class reference image are the minima of the corresponding pixel values of the corresponding pixels of the plurality of reference images of reference bank notes that are assigned to a class. For this purpose, for the pixel value of a pixel of the class reference image, which pixel is arranged at the position x, y, there is chosen the smallest value of the pixel values of the pixels of the plurality of reference images at the position x, y (where applicable, after an alignment with a common reference point by means of the above-described alignment mechanism). In case of colored images, the three color coordinates of a pixel of the class reference image correspond to the minima of the corresponding color coordinates of the pixels of the reference images at the same position.

A class reference image created in this way easily allows, for example, the determination of a region wherein particular optical features occur that appear dark in the reference images, i.e. have a low intensity, and whose position on the bank note is subject to a certain variation. For the nominal value or the denomination 320 and/or the serial number 330, which are printed on the bright background of the bank note 312 of FIG. 4 and hence lead in the reference images of corresponding reference bank notes to low pixel values, there can be specified, for example by means of a class reference image based on the minima of the pixel values of the reference images, respective regions 322 and 332, in which with high probability the denomination or the serial number of a bank note to be classified of this class are to be found.

As this can be inferred from FIG. 1, the control and evaluation unit 30 of the bank note processing apparatus 10 is connected preferably with a computer 38 that has a display unit 39. On the computer 38 there is preferably implemented a graphical user interface, by means of which for example the above-described class reference image based on the minima of the pixel values of the reference images can be represented on the display unit 39, so that a user can analyze the class reference image and, where applicable, can act on the creation or adjustment of a class reference data record. Preferably, the graphical user interface is configured such that a user, by means of the graphical user interface, can define regions of the class reference image, which lead to the creation or adjustment of the class reference data record. For example, a user can define, by means of the graphical user interface, the rectangular regions 322 and 332 represented in FIG. 4, in which with high probability the denomination or the serial number of a bank note to be classified of this class is to be found. Preferably, these regions can be defined by means of functions known to the person skilled in the art from drawing programs, such as for example the function that moving a computer mouse with the mouse button pressed leads to an enlargement or reduction in size of the rectangular region. Of course, regions with different regular and irregular shapes, such as for example circular, elliptical, triangular, and the like, are also thinkable. An enlargement or reduction in size of the regions 322 and/or 332 by the user by means of the graphical user interface preferably leads to the fact that the respective tolerance ranges of the class reference parameters assigned to the denomination and/or the serial number are accordingly enlarged or reduced in size. This makes it possible to adjust the class reference parameter of a class reference data record and its tolerance range in such a way that the denominations and/or serial numbers of the bank notes to be classified of this class lie with high probability within this tolerance range thus determined. However, it is also conceivable that these regions are determined by a software routine implemented on the computer 38 and/or the control and evaluation unit 30, which software routine allows to ascertain regions of a certain intensity in the class reference image, and therefore the creation of a class reference data record can be effected without an action of a user. The computer 38 can further be connected with an external database 40 for storing large amounts of data, in particular image data. In other embodiments it is also conceivable that the computer 38 and/or the external database 40 are part of the control and evaluation device 30.

Furthermore, the class reference image based on the minima of the pixels of the reference images, already described above, can be advantageously employed as follows upon the creation or adjustment of a class reference data record or of a class reference parameter contained therein as well as the tolerance range thereof, namely for bank notes that have a motif as a security feature, a section of the motif being printed with an ink that absorbs radiation in a particular wavelength range, preferably infrared radiation, and a different section of the motif being printed with an ink that is substantially transparent to radiation in this wavelength range, preferably IR radiation. Such a security feature is the motif 350 with an IR-absorbing section 352 and an IR-transparent section 354, as represented in FIG. 4. This security feature is intended to serve the purpose of enabling the sorting out of possibly forged bank notes in which the motif 350 is printed with one ink throughout. In case of reference images of authentic bank notes having such a security feature in the form of the motif 350, which have been created in transmitted-light method by means of an IR radiation source arranged, relative to the sensor unit 26, behind the bank note, the IR-absorbing section 352 has a low intensity (i.e. small pixel values) and the IR-transparent section 354 a large intensity (i.e. large pixel values). In a possibly forged bank note, the motif would have a substantially uniform intensity. An advantageous class reference parameter for distinguishing authentic bank notes from possibly forged bank notes is the ratio of a pixel value averaged over the IR-absorbing section 352 to a pixel value averaged over the IR-transparent section 354. Since in the bank notes of a class, which are employed for creating the reference images, as well as in the bank notes to be classified the exact position of the motif 350 and of the sections 352, 354 can vary due to fluctuations when printing the bank notes, in the class reference image based on the minima of the pixels of the reference images there is determined a region of the IR-absorbing section 352 such that in a bank note to be classified this region with high probability falls within the IR-absorbing section of the bank note to be classified. This is achieved by determining a region of low intensity, i.e. of small pixel values of the IR-absorbing section of the class reference image based on the minima of the pixels of the reference images. The region of the class reference image thus chosen represents, so to speak, an intersection of the IR-absorbing sections of the reference images, whose positions are subject to a certain variation, as mentioned above. This ensures that in a bank note to be classified this region falls with high probability completely within the IR-absorbing section of the bank note to be classified.

The determination of this region of the IR-absorbing section of the class reference image based on the minima of the pixels of the reference images can be effected by a user by means of the graphical user interface implemented on the computer 39 or automatically by means of a software routine implemented in the control and evaluation device 30 and/or the computer 39.

In practice it has been found that the IR-transparent section 354 in bank notes is not subjected to such great printed-image fluctuations as the IR-absorbing section 352. Therefore, a corresponding region of this section 352 can be determined with the aid of the above-mentioned class reference image based on the minima of the pixels of the reference images, with the aid of a class reference image whose pixel values are a different function of the pixel values of the reference images (e.g. maximum or average value), or with the aid of one of the reference images. In accordance with the present invention it is therefore also possible that more than one class reference image are generated on the basis of the plurality of reference images and are employed for the creation or adjustment of a class reference data record.

In accordance with the present invention, a class reference parameter is determined by forming the ratio of a pixel value averaged over the region of the IR-absorbing section 352 to a pixel value averaged over the region of the IR-transparent section 354, in particular the region of the IR-absorbing section 352 having been determined as described above, i.e. with the aid of a class reference image based on the minima of the pixels of the reference images. Such a class reference parameter connected with the motif 350 allows to chose a relatively narrow tolerance range. This is advantageous as a narrow tolerance range leads to a smaller number of misclassified bank notes.

In accordance with a further preferred embodiment, the pixel values of a pixel of a class reference image are the maxima of the corresponding pixel values of the corresponding pixels of the plurality of reference images of reference bank notes that are assigned to a class. For this purpose, for the pixel value of a pixel of the class reference image, which pixel is arranged at the position x, y, there is chosen the greatest value of the pixel values of the pixels of the plurality of reference images at the position x, y (where applicable, after an alignment with a common reference point by means of the above-described alignment mechanism). In case of colored images, again the three color coordinates of a pixel of the class reference image correspond to the maxima of the corresponding color coordinates of the pixels of the reference images at the same position. Such a class reference image based on the maxima of the pixels of the reference images can be advantageously used for example for creating or adjusting class reference parameters as well as their tolerance ranges, which are based on security features which occur with a high intensity in the reference images. This would be the case for example for bank notes, in which the denomination and/or the serial number are printed with bright letters on a dark background.

In a further preferred embodiment, the pixel values of a pixel of the class reference image are the average values of the corresponding pixel values of the corresponding pixels of the plurality of reference images of already classified value documents of the same class. For this purpose, the pixel value of a pixel of the class reference image, which pixel is arranged at the position x, y, is allocated the averaged value of the pixel values of the pixels of the plurality of reference images at the position x, y (where applicable, after an alignment with a common reference point by means of the above-described alignment mechanism). This is advantageous upon the definition of a region in which upon the subsequent classification of bank notes a security feature, e.g. the security thread 340 of the bank note 312 of FIG. 4, is to be found with high probability.

In accordance with a further preferred embodiment, the pixel values of a respective pixel of the class reference image are determined by the difference between the maximum pixel value and the minimum pixel value of the corresponding pixels of the plurality of reference images of already classified value documents of the same class. For this purpose, the pixel value of a pixel of the class reference image, which pixel is arranged at the position x, y is allocated the difference between the maximum and the minimum value of the pixel values of the pixels of the plurality of reference images at the position x, y (where applicable, after an alignment with a common reference point by means of the above-described alignment mechanism). This is particularly advantageous insofar as there can be detected errors in the alignment of the reference images of the already classified bank notes of the same class upon the creation of the class reference image. This can be done either by a user by means of the graphical user interface, which displays the class reference image, and/or automatically by an accordingly configured software routine. If for example the intensity in an extended pixel region of the class reference image created in this way exceeds a predetermined threshold value, this may be due to an error in the alignment of the reference images of the already classified bank notes of the same class. Because with a class reference image thus created, pixels that in a reference image are part of the bright margin region of a reference bank note and in another reference image are part of the dark background outside a reference bank note have a high intensity. In such a case, the alignment algorithm is corrected and/or a new set of reference images for each class is created.

The invention claimed is:

1. At a banknote evaluation machine comprising a sensor unit with at least one imaging optical sensor for creating digital images of bank notes, a processor and a memory, a method for determining a class reference data record for the classification of value documents, in particular bank notes, the method comprising the following steps:

the banknote evaluation machine creating a class reference image by means of a plurality of reference images of already classified value documents of same class, the plurality of reference images being created using the imaging optical sensor; and creating, by using the processor, a class reference data record having at least one class reference parameter with the aid of a user-defined region having at least one optical feature within the class reference image, the class reference parameter being coupled to at least one quantitatively determined property of the user-defined region, the class reference parameter being created by forming a ratio of pixel values from at least two different locations on a value document, the ratio being formed from a pixel value averaged over a specified region of an infrared-absorbing section of the value document to a pixel value averaged over a specified region of an infrared-transparent section of the value document;

wherein the pixel values of a respective pixel of the class reference image are at least one of the average pixel values or median pixel values of the corresponding pixels of the plurality of reference images of already classified value documents of the same class, wherein each class reference parameter has assigned thereto a tolerance range, the tolerance range for each class reference parameter being variable and being dependent on the quantitatively determined property of the user-defined region; and wherein the class reference image of a class of value documents is represented, for analysis, on a display unit by means of a graphical user interface.

2. The method according to claim 1, wherein in an adaptation process for each class to which a value document can be allocated there are created a class reference image and a class reference data record having at least one class reference parameter by means of a plurality of reference images of reference value documents of a respective class.

3. The method according to claim 2, wherein, during the adaptation process, the class reference image of a class of value documents is represented, for the analysis, on a display unit by means of a graphical user interface, wherein the graphical user interface is configured such that a user can participate in the creation of a class reference parameter of a class reference data record with the aid of the class reference image.

4. The method according to claim 1, wherein the step of creating at least one class reference image by means of a plurality of reference images of already classified value documents of the same class preferably further comprises aligning the plurality of reference images of already classified value documents of the same class with respect to a common reference point.

5. The method according to claim 1, wherein for some or all of the classes more than one class reference image is created by means of the plurality of reference images of already classified value documents of the same class and the class reference data record having at least one class reference parameter is created with the aid of more than one class reference image.

6. The method according to claim 1, wherein the pixel values of a pixel of a class reference image are the minima of the corresponding pixel values of the corresponding pixels of the plurality of reference images of already classified value documents of the same class.

7. The method according to claim 1, wherein the pixel values of a pixel of the class reference image are the maxima of the corresponding pixel values of the corresponding pixels of the plurality of reference images of already classified value documents of the same class.

8. The method according to claim 1, wherein the pixel values of a respective pixel of the class reference image are determined by the difference between the maximum pixel value and the minimum pixel value of the corresponding pixels of the plurality of reference images of already classified value documents of the same class.

9. The method according to claim 1, the method further comprising the following steps: determining at least one quantitative property of a value document to be classified; and classifying the value document to be classified on the basis of a comparison of the quantitative property of the value document to be classified with a class reference parameter of a class reference data record.

10. The method of claim 1, wherein the user-defined region is specified by a user via a graphical user interface.

11. An apparatus for processing value documents, in particular bank notes, wherein the apparatus comprises:

a processor; a memory;

a hardware sensor for generating an image of a bank note including at least a lens and a light sensor;

a control and evaluation device, wherein the control and evaluation device is configured to carry out following steps:

creating a class reference image by means of a plurality of images of already classified value documents of same class, the plurality of reference images being created using an imaging optical sensor; and creating, by using the processor, a class reference data record having at least one class reference parameter with the aid of a user-defined region having at least one optical feature within the class reference image, the class reference parameter being coupled to at least one quantitatively determined property of the user-defined region, the class reference parameter being created by forming a ratio of pixel values from at least two different locations on a value document, the ratio being formed from a pixel value averaged over a specified region of an infrared-absorbing section of the value document to a pixel value averaged over a specified region of an infrared-transparent section of the value document;

wherein the pixel values of a respective pixel of the class reference image are at least one of the average pixel values or median pixel values of the corresponding pixels of the plurality of images of already classified value documents of the same class, wherein each class reference parameter has assigned thereto a tolerance range, the tolerance range for each class reference parameter being variable and being dependent on the quantitatively determined property of the user-defined region; and wherein the class reference image of a class of value documents is represented, for analysis, on a display unit by means of a graphical user interface.

12. The apparatus according to claim 11, wherein the control and evaluation device is further configured to carry out the following further steps:

determining at least one quantitative property of a value document to be classified; and classifying the value document to be classified on the basis of a comparison of the quantitative property of the value document to be classified with the class reference parameter.

13. The apparatus according to claim 11, wherein the apparatus further comprises a computer having a display unit connected with the control and evaluation device, wherein there is implemented on the computer a graphical user interface allowing a user to participate in the step of creating a class reference data record having at least one class reference parameter with the aid of the class reference image.

14. A computer-readable hardware storage device comprising a memory having stored thereon a program for determining a class reference data record for the classification of value documents, comprising:

creating a class reference image by means of a plurality of reference images of already classified value documents of same class, the plurality of reference images being created using an imaging optical sensor; and creating, by using a processor, a class reference data record having at least one class reference parameter with the aid of a user-defined region having at least one optical feature within the class reference image, the class reference parameter being coupled to at least one quantitatively determined property of the user-defined region, the class reference parameter being created by forming a ratio of pixel values from at least two different locations on a value document, the ratio being formed from a pixel value averaged over a specified region of an infrared-absorbing section of the value document to a pixel value averaged over a specified region of an infrared-transparent section of the value document;

wherein the pixel values of a respective pixel of the class reference image are at least one of the average pixel values or median pixel values of the corresponding pixels of the plurality of reference images of already classified value documents of the same class, wherein each class reference parameter has assigned thereto a tolerance range, the tolerance range for each class reference parameter being variable and being dependent on the quantitatively determined property of the user-defined region; and wherein the class reference image of a class of value documents is represented, for analysis, on a display unit by means of a graphical user interface.

15. The computer-readable hardware storage device of claim 14, wherein the computer program is stored on a data carrier.

* * * * *